Figure 1:
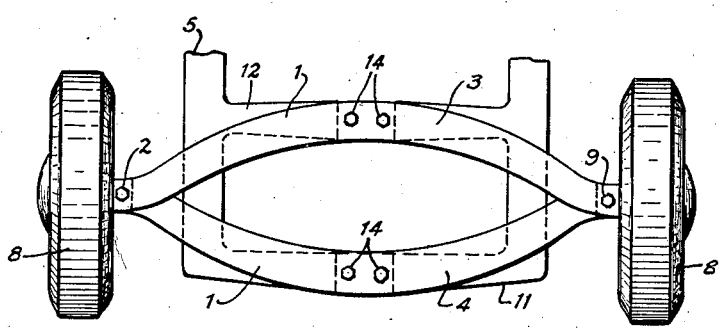

Jan. 11, 1949.   C. N. ARONSON   2,458,548
WHEEL SUSPENSION FOR VEHICLES
Filed Nov. 14, 1944

Inventor
Charles N. Aronson.

By Clarence A. O'Brien
and Harvey B. Jacobson
Attorneys

Patented Jan. 11, 1949

2,458,548

UNITED STATES PATENT OFFICE 2,458,548

WHEEL SUSPENSION FOR VEHICLES

Charles N. Aronson, Niagara Falls, N. Y.

Application November 14, 1944, Serial No. 563,439

1 Claim. (Cl. 267—36)

My invention relates to vehicle wheel suspensions, and more specifically to suspension springs for the wheels of automobiles.

The invention is designed with the primary objects in view of providing independent spring suspensions for the wheels of an automobile, of simple form and inexpensive construction, duplicate springs for the front and rear wheels which are interchangeable as units and also as regards parts, and which provide for full floating of the wheels with low unsprung weights, eliminates sliding parts, will not twist under driving torque, afford maximum riding comfort, and are durable and safe.

Other and subordinate objects are also comprehended by my invention, all of which, together with the precise nature of my improvements, will be readily understood when the succeeding description and claim are read with reference to the drawing accompanying and forming part of this specification.

Figure 2:
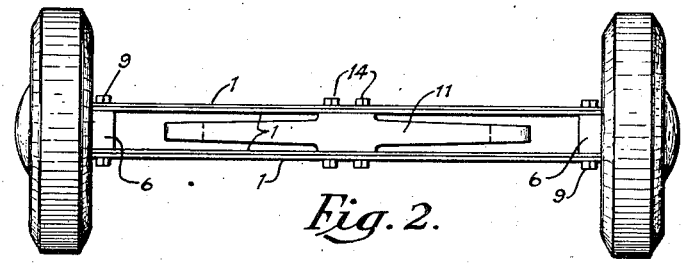
Figure 3:
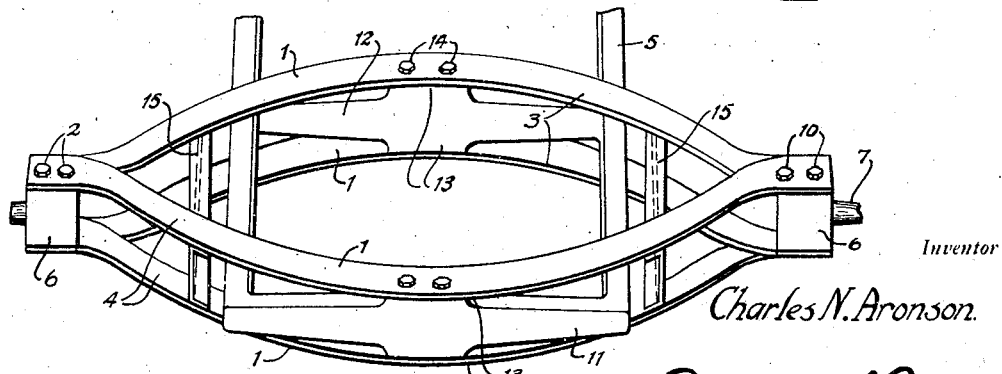

In said drawing:

Figure 1 is a fragmentary view in top plan of a front wheel suspension constructed in accordance with my invention, Figure 2 is a view in front elevation, and Figure 3 is a view in perspective of the rear wheel suspension.

Referring to the drawing by numerals, according to my invention, a spring suspension is provided for each pair of wheels in an automobile comprising pairs of bar-like, bowed spring leaves 1 of semi-elliptical form edgewise with the exception of alined ends 2. The leaves 1 in each suspension are arranged in superposed pairs designated, as units, 3, 4, to extend endwise across the chassis 5 flatwise, as regards each leaf, with the pairs opposed and each pair straddling the chassis 5 with the leaves 1 bowed oppositely relative to those of the other pair, and with the ends 2 of one pair interlapping those of the other pair and aligned therewith.

A pair of wheel mounting blocks 6, with wheel spindles 7 thereon are interposed between the ends 2 of the pairs of spring leaves, 3, 4. In the case of the front wheels 8, a single spindle bolt, or the like, 9 is suitably extended through the ends 2 of the spring leaves 1 and through the blocks 6 to provide for steering said wheels, whereas, in the case of the rear wheels, not shown, the ends 2 of the spring leaves 1, and the blocks 6 are rigidly connected together, as by bolts 10, extended through said ends 2 into said blocks.

Each pair 3, 4 of spring leaves 1 is connected to a transverse frame bar of the chassis 5, one of which 11 may be an end bar of said chassis, and the other 12 an intermediate bar of the chassis. The bars 11, 12 are provided with flat, central, raised bosses 13 to which the central portions of the spring leaves 1 are bolted flat, as at 14, and whereby a certain degree of clearance is provided for between the spring leaves 1 and said chassis 5 beyond said bosses 13 permitting free vertical flexing of said leaves 1.

As will now be seen, the wheels are independently mounted for free floating movement, since the spring leaves 1 may flex vertically freely, the length of spring leaves 1 for each wheel correspond to the length between the points of attachment to the chassis 5 and the blocks 6, so that substantially one-half the length of each leaf 1 suspends the wheel, thereby providing for maximum flexibility in the suspension. Also, each pair 3, 4 of leaves 1 opposes tendency of the other pair to twist because of torque stresses and strains, there is a minimum of surface engagement of the leaves 1 with each other and with the frame bars 11, 12 obviating rubbing and wear, and the weight is uniformly distributed on the spring leaves 1 of each suspension.

If desired, for offsetting extra torque or for more rigid resistance to torque, a pair of torque-neutralizing members, such as the channel bars 15, may be interposed between the leaves 1 of the pairs 3, 4 crosswise of said leaves upon opposite sides of the chassis 5, suitably secured and welded to said leaves either permanently or detachably to neutralize tendency of said leaves to twist under driving or braking torque especially.

The foregoing will, it is believed, suffice to impart a clear understanding of my invention without further explanation.

Manifestly, the invention, as described, is susceptible of modification without departing from the inventive concept, and within the scope of the appended claim.

What I claim is:

The combination with the chassis frame of an automobile, and a pair of ground wheels, of a spring suspension for said wheels comprising flat bar leaves arranged in opposed pairs with the pairs straddling said chassis frame crosswise thereof, there being a single upper and lower leaf in each pair with flat sides confronting, and the pairs of leaves being arcuate edgewise intermediate the ends thereof with each pair arching edgewise away from the other pair, the ends of said pairs of leaves interlapping, blocks with wheel mounting spindles thereon interposed between said interlapping ends and rigidly connecting the same together, and means rigidly attaching the center portions of said pairs of leaves to said chassis frame with the remainder of said pairs of leaves clear of said chassis frame.

CHARLES N. ARONSON.

REFERENCES CITED

The following references are of record in the file of this patent:

UNITED STATES PATENTS

| Number | Name | Date |
|---|---|---|
| 1,737,856 | Lundelius et al. | Dec. 3, 1929 |
| 1,794,145 | Bussien | Feb. 24, 1931 |
| 1,864,625 | Wells | June 28, 1932 |
| 2,059,246 | Kliesrath | Nov. 3, 1936 |

FOREIGN PATENTS

| Number | Country | Date |
|---|---|---|
| 181,323 | Great Britain | Nov. 16, 1922 |
| 211,877 | Great Britain | Sept. 25, 1924 |
| 257,052 | Great Britain | Apr. 14, 1927 |